United States Patent
Kikkawa et al.

(10) Patent No.: US 9,572,187 B2
(45) Date of Patent: Feb. 14, 2017

(54) INFORMATION PROCESSING APPARATUS, INFORMATION PROCESSING METHOD, AND PROGRAM

(71) Applicant: SONY CORPORATION, Tokyo (JP)

(72) Inventors: Norifumi Kikkawa, Tokyo (JP); Kenichi Ishida, Tokyo (JP); Takeshi Oishi, Tokyo (JP); Eri Ninomiya, Tokyo (JP); Akihiro Ishida, Tokyo (JP)

(73) Assignee: SONY CORPORATION, Tokyo (JP)

( * ) Notice: Subject to any disclaimer, the term of this patent is extended or adjusted under 35 U.S.C. 154(b) by 21 days.

(21) Appl. No.: 14/602,514

(22) Filed: Jan. 22, 2015

(65) Prior Publication Data
US 2015/0215939 A1 Jul. 30, 2015

(30) Foreign Application Priority Data
Jan. 29, 2014 (JP) ................................. 2014-013975

(51) Int. Cl.
*H04W 76/02* (2009.01)
*H04W 88/06* (2009.01)
*H04W 84/12* (2009.01)
*H04W 48/12* (2009.01)

(52) U.S. Cl.
CPC .......... *H04W 76/023* (2013.01); *H04W 48/12* (2013.01); *H04W 84/12* (2013.01); *H04W 88/06* (2013.01)

(58) Field of Classification Search
CPC .................................................. H04W 76/023
See application file for complete search history.

(56) References Cited

U.S. PATENT DOCUMENTS

| | | | |
|---|---|---|---|
| 6,912,394 B1 * | 6/2005 | Obata ................. | H04W 72/085 370/252 |
| 2009/0276639 A1 * | 11/2009 | Saha ..................... | H02M 3/156 713/300 |
| 2012/0158839 A1 * | 6/2012 | Hassan ................. | H04W 8/005 709/204 |

FOREIGN PATENT DOCUMENTS

JP 2010-011397 A 1/2010

* cited by examiner

*Primary Examiner* — Peter Cheng
*Assistant Examiner* — Angel Brockman
(74) *Attorney, Agent, or Firm* — Chip Law Group (57) ABSTRACT

An information processing apparatus includes a communication unit and a controller. The communication unit is configured to be capable of switching between a first mode for communicating with a different device by a first wireless communication system and a second mode for communicating with the different device by a second wireless communication system. The controller is configured to control the communication unit to select a radio-frequency range used in the first mode as a radio-frequency range used in the second mode, in a case where a communication system for communicating with the different device is switched from the first wireless communication system to the second wireless communication system.

11 Claims, 5 Drawing Sheets

```
POST /config-goch/ HTTP/1.1[CR+LF]

Host: 192.168.2.30:80[CR+LF]

Content-Type: application/xml[CR+LF]

Content-Length: <xml-data-length>[CR+LF]

[CR+LF]

<?xml version="1.0"> [CR+LF]

<ndbd xmlns="http://xmlns.sony.net/ndb" version="1.0">[CR+LF]

<protocol type="miracast">

<goch>6</goch>

<ssid>my_home_ap</ssid>

</protocol>[CR+LF]

</ndbd>[CR+LF]
```

ND PROGRAM

CROSS REFERENCE TO RELATED APPLICATIONS

This application claims the benefit of Japanese Priority Patent Application JP 2014-013975 filed Jan. 29, 2014, the entire contents of which are incorporated herein by reference.

BACKGROUND

The present disclosure relates to an information processing apparatus capable of wirelessly communicating with a different device, and an information processing method and a program for the information processing apparatus.

Wi-Fi (Wireless Fidelity) is widely used as a standard of a wireless LAN (Local Area Network). Among devices supporting the Wi-Fi, there are devices that support both of communication systems of a Wi-Fi Infrastructure mode for communicating with a different device through an access point and a Wi-Fi Direct mode for directly communicating with a different device not through an access point.

Some devices that support both of the modes as described above have limits, that is, are incapable of executing both of the modes at the same time. Such devices perform communication by switching between the modes, depending on a communication mode of an application executed by those devices.

Japanese Patent Application Laid-open No. 2010-11397 discloses a technique in which a wireless communication terminal and an access point switch between a plurality of communication systems and between channels used therefor.

SUMMARY

However, since it takes time to switch the communication system as disclosed in Japanese Patent Application Laid-open No. 2010-11397, there is a problem that user experience of the application immediately after switching is reduced in each time switching is performed.

In view of the circumstances as described above, there is a need for providing an information processing apparatus capable of shortening time for switching a wireless communication system, and an information processing method and a program for the information processing apparatus.

According to an embodiment of the present disclosure, there is provided an information processing apparatus including a communication unit and a controller. The communication unit is configured to be capable of switching between a first mode for communicating with a different device by a first wireless communication system and a second mode for communicating with the different device by a second wireless communication system. The controller is configured to control the communication unit to select a radio-frequency range used in the first mode as a radio-frequency range used in the second mode, in a case where a communication system for communicating with the different device is switched from the first wireless communication system to the second wireless communication system.

With this configuration, the information processing apparatus matches the radio-frequency range, which is used for communication with the different device by the first wireless communication system, with the radio-frequency range, which is used for communication with the different device by the second wireless communication system, and thus a radio-frequency range to be selected is determined. This can shorten time for switching the wireless communication system.

The first wireless communication system may be a system for communicating with the different device through an access point, and the second wireless communication system may be a system for directly communicating with the different device not through the access point. In this case, the controller may be configured to control the communication unit to use the radio-frequency range specified by the access point in the first mode for communication with the different device in the second mode.

With this configuration, the information processing apparatus can set the radio-frequency range specified by the access point to be used for direct communication with the different device, to shorten the time for switching between the communication systems. Herein, the first mode is a Wi-Fi Infrastructure mode for example, and the second mode is a Wi-Fi Direct mode for example, but the first and second modes are not limited thereto.

The controller may be configured to control the communication unit to transmit a request signal for requesting the different device to use the radio-frequency range specified by the access point in the first mode for communication with the information processing apparatus, in a case where the different device is determined as a group owner in the second mode, the group owner functioning as an access point in a group including the different device and the information processing apparatus.

With this configuration, even when the information processing apparatus is not determined as a group owner, the information processing apparatus can transmit a request on the radio-frequency range to the different device, to shorten the switching time of the communication system.

The controller may be configured to control the communication unit to include, in the request signal, identification information of the access point and request information for requesting retrieval of the access point on a network based on the identification information and selection of the radio-frequency range specified by the retrieved access point.

With this configuration, the information processing apparatus involves the identification information of the access point in the request signal, and thus even when the radio-frequency range used by the access point is changed, the information processing apparatus can cause the different device to follow that change. This can shorten the switching time of the communication system. Herein, the identification information described above is an SSID (Service Set Identifier) for example, but it is not limited thereto.

The controller may be configured to control the communication unit to include, in the request signal, request information for requesting a change of the radio-frequency range into the radio-frequency range specified by the access point, in a case where a radio-frequency range selected by the different device is different from the radio-frequency range specified by the access point.

With this configuration, even when the radio-frequency range selected by the different device as a group owner is different from the radio-frequency range used by the access point, the information processing apparatus can request the change, to shorten the switching time of the communication system.

The controller may be configured to select, in a case where the information processing apparatus is determined as a group owner functioning as an access point in a group including the information processing apparatus and the different device and receives from the different device a request signal for requesting the information processing apparatus to use a radio-frequency range specified by the access point for communication with the different device in the second mode, the radio-frequency range specified by the access point in accordance with the request signal.

With this configuration, the information processing apparatus can select the radio-frequency range used by the access point in the first mode based on the request from the different device, to shorten the switching time of the communication system.

The request signal may contain identification information of the access point. In this case, the controller may be configured to control the communication unit to retrieve the access point on a network based on the identification information and select the radio-frequency range specified by the retrieved access point.

With this configuration, the information processing apparatus receives the identification information of the access point and thus even when the radio-frequency range used by the access point is changed, the information processing apparatus can follow that change. This can shorten the switching time of the communication system.

The different device may include a first device and a second device. In this case, the controller may be configured to control the communication unit to use, in a case where communication within a first group including the information processing apparatus and the first device is switched to communication within a second group including the information processing apparatus and the second device in the second mode, a frequency range used in the communication within the first group for the communication within the second group.

With this configuration, the information processing apparatus can shorten time for switching even when not only the communication system but also a communication destination are switched.

According to another embodiment of the present disclosure, there is provided an information processing method including: detecting a switching event from a first mode for communicating with a different device by a first wireless communication system to a second mode for communicating with the different device by a second wireless communication system; and selecting a radio-frequency range used in the first mode as a radio-frequency range used in the second mode, when switching is performed.

According to still another embodiment of the present disclosure, there is provided a program causing an information processing apparatus to execute: detecting a switching event from a first mode for communicating with a different device by a first wireless communication system to a second mode for communicating with the different device by a second wireless communication system; and selecting a radio-frequency range used in the first mode as a radio-frequency range used in the second mode, when switching is performed.

As described above, according to the present disclosure, it is possible to shorten time for switching a wireless communication system. However, such effects do not limit the present disclosure.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.

General Outline of System

Figure 1:
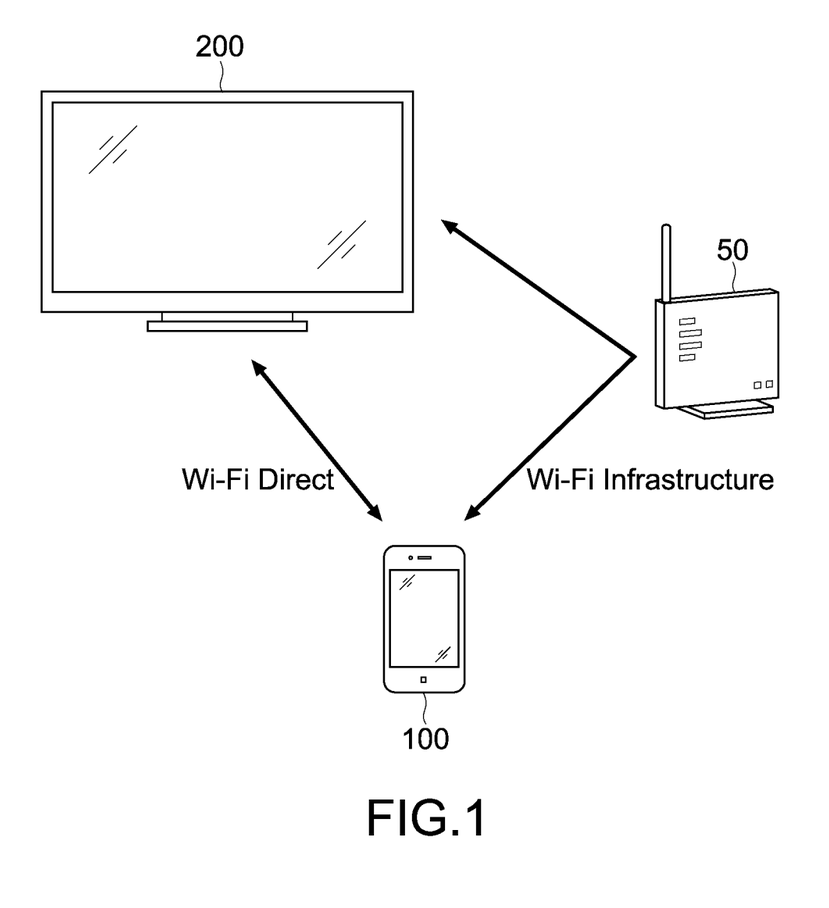
FIG. 1 is a diagram showing a configuration of a system according to an embodiment of the present disclosure.

FIG. 1 is a diagram showing the general outline of a system according to an embodiment of the present disclosure. As shown in FIG. 1, this system includes a communication terminal 100, a TV (television) 200, and an access point (AP) 50. The communication terminal 100 is a smartphone, a mobile phone, a tablet, or the like. The communication terminal 100 and the TV 200 are each capable of communicating by Wi-Fi and executing two modes, i.e., a Wi-Fi Infrastructure mode for communicating with each other through the AP 50 and a Wi-Fi Direct mode for directly communicating with each other not through the AP 50.

As a matter of course, a device capable of executing those two modes may be present in addition to the communication terminal 100 and the TV 200. Additionally, two or more APs 50 may be present. Each of the communication terminal 100 and the TV 200 is incapable of executing the Wi-Fi Infrastructure mode and the Wi-Fi Direct mode at the same time, and thus executes any one of the modes by switching. For example, the Wi-Fi Infrastructure mode is normally executed, and the mode is switched to the Wi-Fi Direct mode as appropriate.

In the case where the communication terminal 100 and the TV 200 communicate with each other in the Wi-Fi Direct mode, one of those devices creates a group for their communication. The device that creates the group is a group owner (hereinafter, referred to as GO) functioning as an access point and determines a radio-frequency range (hereinafter, referred to as a GO-CH (Group Owner Ch)) to be used by that group. A device to be a group owner is dynamically determined by a negotiation, for example.

A device other than the group owner searches for a network and finds a group to be connected, and then performs Wi-Fi Direct communication by using a GO-CH specified by the owner device.

In general, a different radio-frequency range (channel) is assigned to different wireless communication, to ensure high throughput available in each communication. In this embodiment, however, the communication terminal 100 and the TV 200 described above operate so as to match the GO-CH for the Wi-Fi Direct mode, which is set by the group owner, with a channel that is the same as the channel used in the Wi-Fi Infrastructure mode set by the AP 50. Hereinafter, this processing is also referred to as channel matching processing.

This allows a switching time for a communication system (mode) to be shortened even with a disadvantage in terms of throughput.

Further, since the group owner is dynamically determined as described above, a device (of a user) that intends to shorten a switching time of the communication system does not necessarily become a group owner. In this regard, in this embodiment, in the case where a device that did not become a group owner intends to shorten the switching time, such a device can request the device serving as a group owner to match the GO-CH with a channel that is the same as the channel used by the AP 50. According to this request, a mechanism for the device serving as a group owner to match both of the channels is provided.

Hardware Configuration of Communication Terminal

Figure 2:
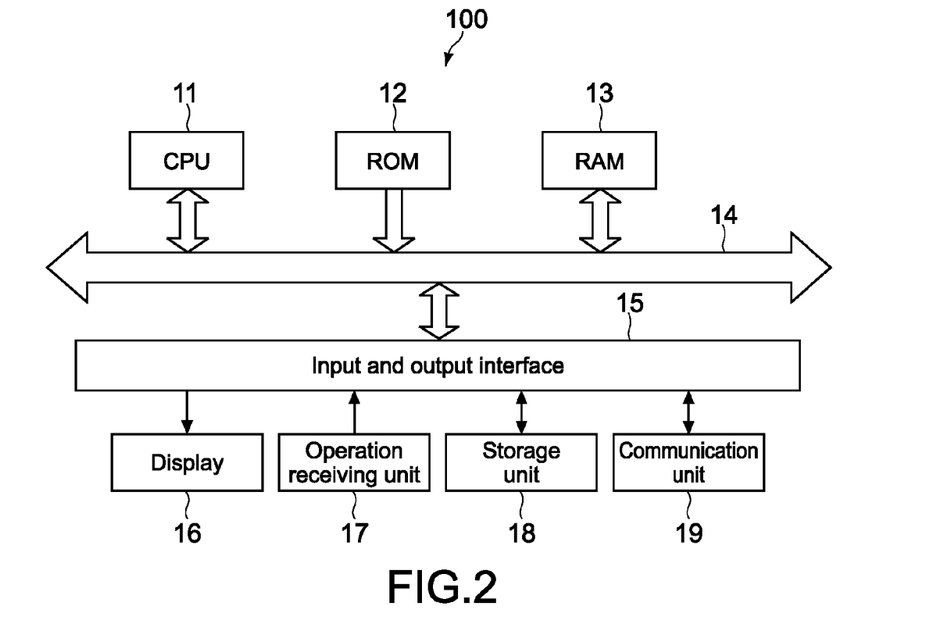
FIG. 2 is a block diagram showing a hardware configuration of a communication terminal in the system.

FIG. 2 is a diagram showing a hardware configuration of the communication terminal 100. As shown in FIG. 2, the communication terminal 100 includes a CPU (Central Processing Unit) 11, a ROM (Read Only Memory) 12, a RAM (Random Access Memory) 13, an input and output interface 15, and a bus 14 that connects those above components to one another.

The CPU 11 accesses the RAM 13 and the like when necessary and performs overall control of the whole blocks of the communication terminal 100 while performing various types of computation processing.

The ROM 12 is a nonvolatile memory in which an OS to be executed by the CPU 11 and firmware such as a program and various parameters are fixedly stored.

The RAM 13 is used as a work area or the like of the CPU 11 and temporarily stores the OS, various applications in execution, and various types of data being processed.

The input and output interface 15 is connected to a display 16, an operation receiving unit 17, a storage unit 18, a communication unit 19, and the like.

The display 16 is a display device using, for example, an LCD (Liquid Crystal Display), an GELD (Organic Electroluminescence Display), or a CRT (Cathode Ray Tube).

The operation receiving unit 17 is an input device including a touch panel, buttons, and the like and is integrated with the display 16.

The storage unit 18 is a non-volatile memory such as a flash memory (SSD; Solid State Drive) or another solid-state memory. The storage unit 18 stores, in addition to the OS, various types of content, applications, and the like, various types of software and data necessary for the channel matching processing in this embodiment.

The communication unit 19 is a module for connecting to a mobile network such as 3G (third generation) or LTE (Long Term Evolution), in addition to the Wi-Fi described above, and handles processing of communicating with a different device via the network.

Hardware Configuration of TV

Figure 3:
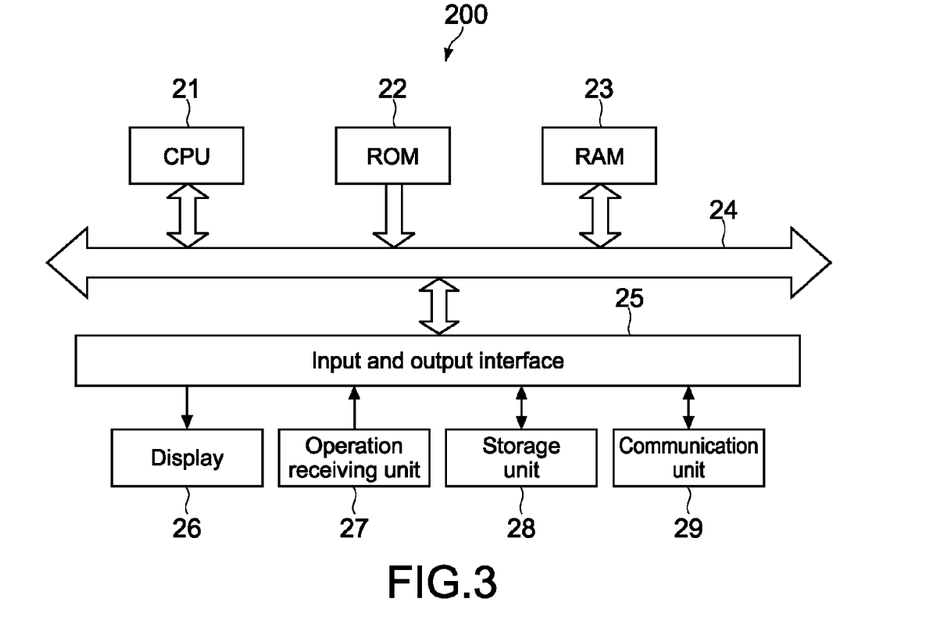
FIG. 3 is a block diagram showing a hardware configuration of a TV (television) in the system.

FIG. 3 is a diagram showing a hardware configuration of the TV 200. As described in FIG. 3, a basic hardware configuration of the TV 200 is basically the same as the hardware configuration of the communication terminal 100 described above. Specifically, the TV 200 includes a CPU 21, a ROM 22, a RAM 23, an input and output interface 25, a bus 24 that connects those above components to one another, an operation receiving unit 27, a storage unit 28, and a communication unit 29.

The CPU 21 controls each block of the storage unit 28, the communication unit 29, and the like and executes processing of communicating with the communication terminal 100 and various types of data processing.

The storage unit 28 stores, in addition to various types of content, applications, and the like, various types of software and data necessary for the channel matching processing described above. As the storage unit 28, an HDD (Hard Disk Drive) may be used.

The communication unit 29 includes a NIC (Network Interface Card) for Ethernet (registered trademark), for example, in addition to the Wi-Fi described above, and handles processing of communicating with a different device.

Though not shown in FIG. 3, the TV 200 also includes specific hardware to function as a TV, such as an antenna terminal for receiving TV broadcast, a tuner for channel selection, a demultiplexer for separating received data into video and audio, and a decoder for decoding the separated data pieces.

Operation of System

Next, the channel matching processing in the system configured as described above will be described. In the following description, the CPU 11 of the communication terminal 100 and the CPU 21 of the TV 200 mainly operate, but also operate in cooperation with programs executed under the control of the CPUs. A device that triggers the channel matching processing described above may be any of the communication terminal 100 and the TV 200.

Channel Matching Request

In this embodiment, a request for the channel matching from a non-group owner device to a group owner device is transmitted as a unique command by HTTP (Hypertext Transfer Protocol). However, this request for the channel matching may be transmitted by a command other than HTTP.

Figure 4:
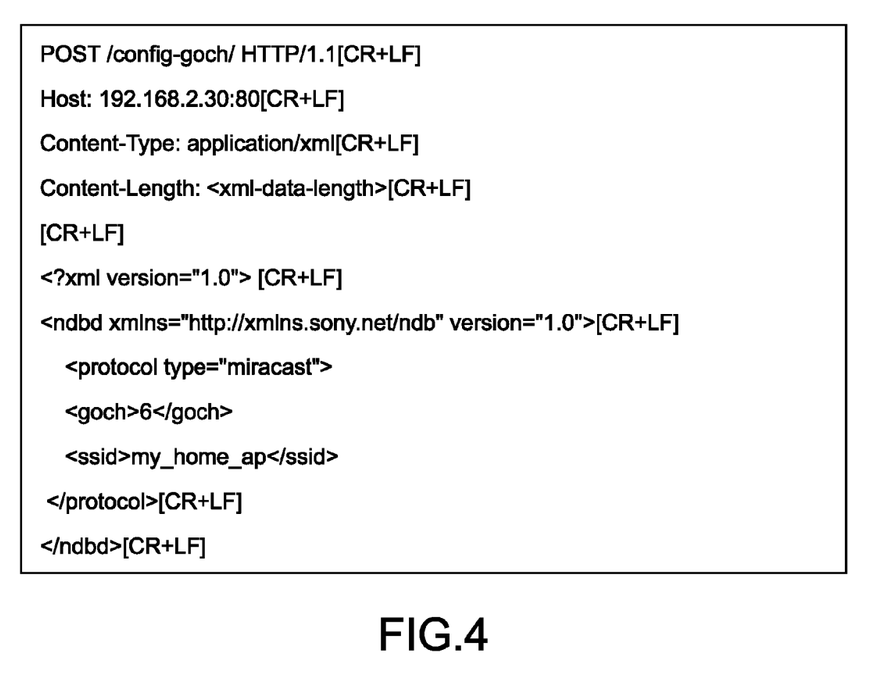
FIG. 4 is a diagram showing an example of an HTTP (Hypertext Transfer Protocol) request that is transmitted from a device as a non-group owner to a device as a group owner in the system.

FIG. 4 is a diagram showing an example of an HTTP request that is transmitted from a non-group owner device to a group owner device in the system. In this example, an XML (Extensible Markup Language) is used as a language, but other languages may be used.

In the channel matching request processing of this embodiment, a port and an URL (Uniform Resource Locator) for receiving a request are determined as a rule. For example, as shown in FIG. 4, at a port of number 80, a path portion of the URL is determined as "/config-goch/".

When receiving a HTTP POST Request to the URL described above, the group owner device reads a GO-CH described in the body. In the case where a group already created at that time exists, the group owner device changes its GO-CH.

Further, in the case where an SSID (Service Set Identifier) of the AP 50 is described in the request, the group owner device searches for the AP 50 on the network, and changes the GO-CH of the group, which is created by the group owner device, into a channel used in the AP 50.

In a subsequent group creation as well, the group owner device stores a specified channel or a specified (SSID of) AP 50 therein in advance and sets the channel as a GO-CH. In other words, the non-group owner device specifies not only the channel to be changed but also the SSID of the AP 50 in the request, and thus even when the channel used by the AP 50 is changed afterward, the non-group owner device can cause the group owner device to change the GO-CH according to the change.

Hereinafter, operations of the respective devices in the channel matching processing described above will be described in detail. In the following description, it is assumed that the communication terminal 100 triggers the channel matching processing and requests the TV 200 to match channels as appropriate.

Operation of Device that Triggers Channel Matching Processing

Figure 5:
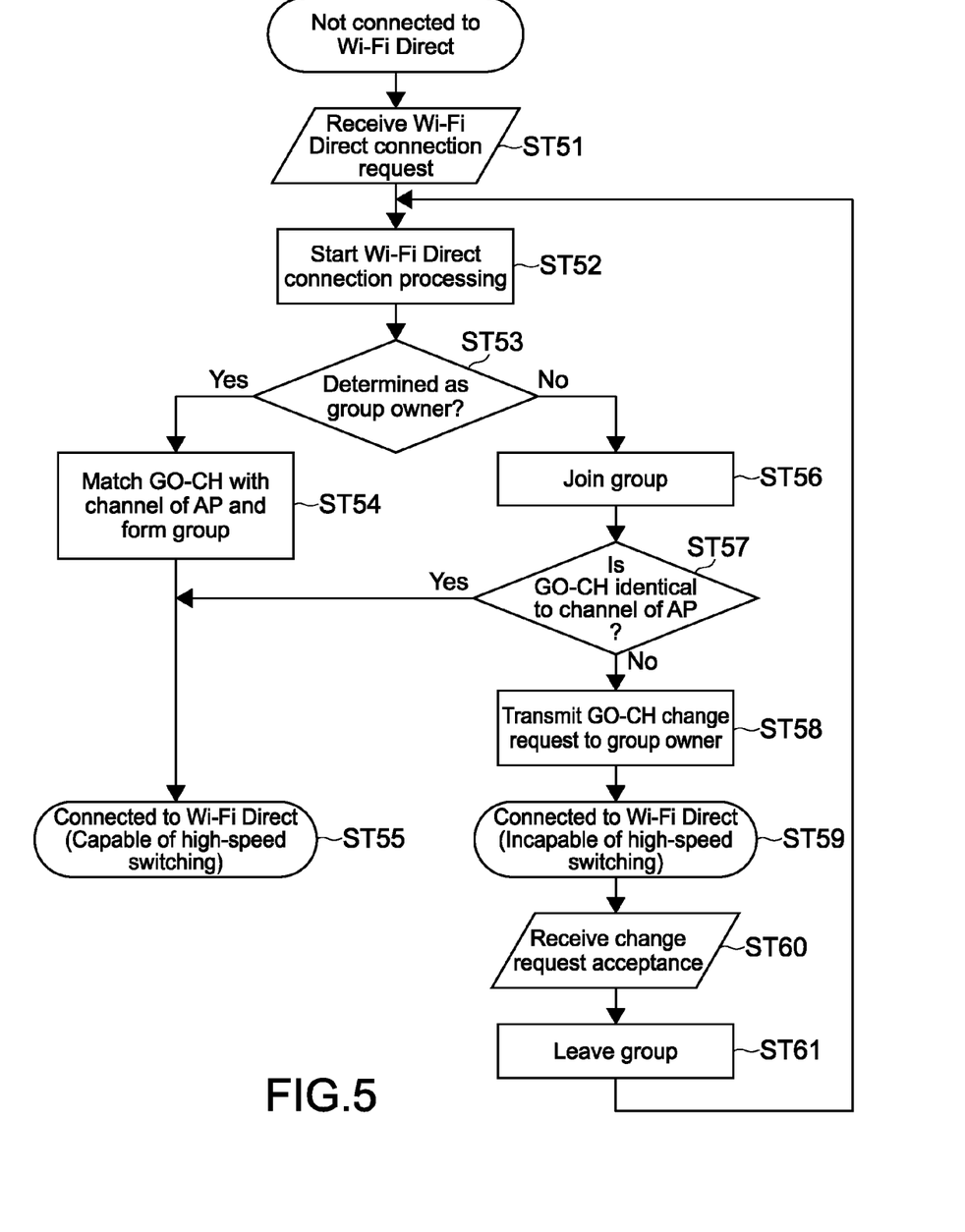
FIG. 5 is a flowchart showing an operation flow of a device that starts processing to match channels used in Wi-Fi Direct and Wi-Fi Infrastructure in the system.

First, an operation of the communication terminal 100 that triggers the channel matching processing will be described. FIG. 5 is a flowchart showing an operation flow of the communication terminal 100.

As shown in FIG. 5, the CPU 11 of the communication terminal 100 first receives a Wi-Fi Direct connection request from the TV 200 in a state of being not yet connected to Wi-Fi Direct (including a state during execution of the Wi-Fi Infrastructure mode) (Step 51). This event may be detected as an event that is requested for connection to the TV 200 by the Wi-Fi Direct from an application layer of the communication terminal 100.

Subsequently, the CPU 11 starts processing of connecting to Wi-Fi Direct in accordance with the request described above (Step 52). Specifically, the CPU 11 performs a negotiation on which device is to be a group owner, with the TV 200 as a connection destination, and determines a group owner.

Subsequently, the CPU 11 determines whether the communication terminal 100 is determined as a group owner or not (Step 53). When determining that the communication terminal 100 is determined as a group owner (Yes), the CPU 11 sets, as a GO-CH to be used, a channel that is the same as the channel used by the AP 50. The AP 50 is a connection target in the Wi-Fi Infrastructure mode. The CPU 11 then forms a group together with the TV 200 (Step 54). This makes the communication terminal 100 to be connected to Wi-Fi Direct (Step 55). After that, in the case where a switching event from the Wi-Fi Infrastructure mode to the Wi-Fi Direct mode occurs, the communication terminal 100 can switch the communication system at high speed by selecting the GO-CH that is the same as the channel used by the AP 50.

On the other hand, in Step 53, when determining that the communication terminal 100 is not determined as a group owner (No), the CPU 11 joins the group that the TV 200 serving as a group owner forms (Step 56).

Subsequently, the CPU 11 determines whether or not the GO-CH used in the group is the same as the channel used by the AP 50. The AP 50 is a connection target of the communication terminal 100 in the Wi-Fi Infrastructure mode (Step 57).

When the GO-CH is the same as the channel used by the AP 50 (Yes), as in the above case, high-speed switching can be performed in a subsequent switching event of the communication system.

When the GO-CH is not the same as the channel used by the AP 50 (No), the CPU 11 transmits a GO-CH change request shown in FIG. 4 to the TV 200 as a group owner (Step 58).

At this point, the channel used for communication of the communication terminal 100 with the TV 200 by Wi-Fi Direct is different from the channel used by the AP 50, and thus communication by Wi-Fi Direct is executed in a state where the high-speed switching is not available (Step 59).

Subsequently, when receiving an acceptance of the GO-CH change request from the TV 200 (Step 60), the CPU 11 leaves the current group (Step 61).

Subsequently (after Step 52), the TV 200 changes the GO-CH and forms a new group based on the GO-CH change request, to establish a Wi-Fi Direct connection capable of the high-speed switching. As described above, even when the channel used by the AP 50 is changed, the GO-CH is changed according to the change.

(Operation of Device that Receives Channel Matching Processing)

Figure 6:
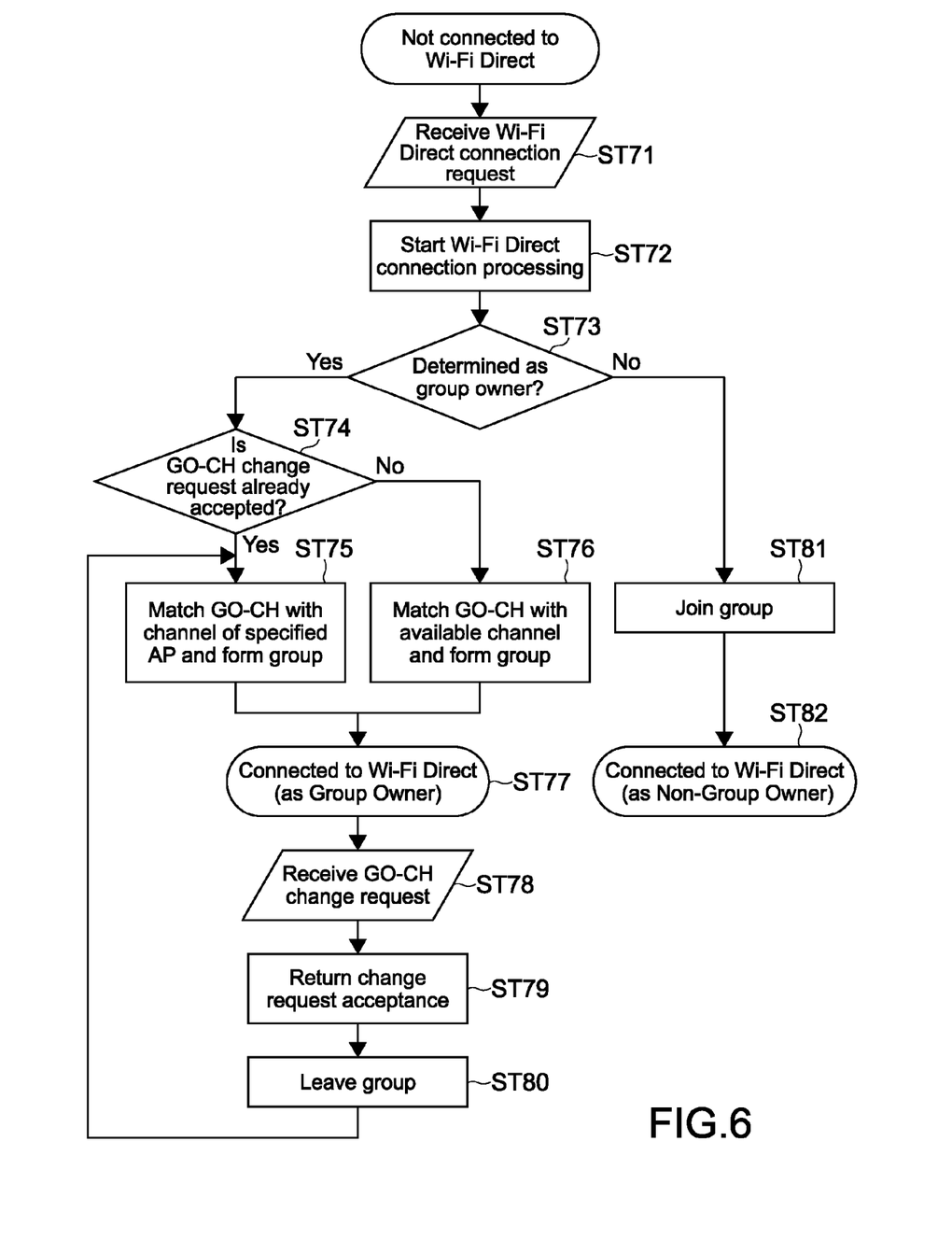
FIG. 6 is a flowchart showing an operation flow of a device that receives a request from the device that starts processing to match channels used in Wi-Fi Direct and Wi-Fi Infrastructure in the system.

Next, an operation of the TV 200 as a device that receives a channel matching request will be described. FIG. 6 is a flowchart showing an operation flow of the TV 200.

As shown in FIG. 6, the CPU 21 of the TV 200 first receives a Wi-Fi Direct connection request from the communication terminal 100 in a state of being not yet connected to Wi-Fi Direct (including a state during execution of the Wi-Fi Infrastructure mode) (Step 71). This event may be detected as an event that is requested for connection to the communication terminal 100 by the Wi-Fi Direct from an application layer of the TV 200.

Subsequently, the CPU 21 starts processing of connecting to Wi-Fi Direct in accordance with the request described above (Step 72). Specifically, the CPU 21 performs a negotiation on which device is to be a group owner, with the communication terminal 100 as a connection destination, and determines a group owner.

Subsequently, the CPU 21 determines whether the TV 200 is determined as a group owner or not (Step 73).

When determining that the TV 200 is determined as a group owner (Yes), the CPU 21 determines whether or not the TV 200 already accepts the GO-CH change request received from the communication terminal 100 (Step 74).

When determining that the TV 200 already accepts the GO-CH change request received from the communication terminal 100 (Yes), the CPU 21 sets the GO-CH to a channel that is the same as the channel used by the AP 50 specified by the communication terminal 100, and forms a group (Step 75).

When determining that the TV 200 does not accept the GO-CH change request received from the communication terminal 100 (No), the CPU 21 sets the GO-CH to a channel that is available at that time (for example, advantageous in throughput), and forms a group (Step 76).

By the processing of Step 75 or Step 76, the TV 200 as a group owner is in a state connected to the Wi-Fi Direct (Step 77).

When receiving the GO-CH change request from the communication terminal 100 (Step 78), the CPU 21 returns a GO-CH change request acceptance to the communication terminal 100 (Step 79).

The CPU 21 then leaves the group formed as described above (Step 80), changes the GO-CH to a channel that is the same as the channel used by the AP 50 specified by the change request, and forms a new group (Step 75). Thus, afterwards, in the case where a switching event from the Wi-Fi Infrastructure mode to the Wi-Fi Direct mode occurs, the TV 200 also selects a GO-CH that is the same as the channel used by the AP 50, so that the communication system can be switched at high speed. Further, even when the channel used by the AP 50 is changed, the GO-CH is changed according to the change.

On the other hand, when the TV 200 is not determined as a group owner in Step 73 (No), the CPU 21 joins the group formed by the communication terminal 100 (Step 81). Thus, the TV 200 as a non-group owner is in a state connected to the Wi-Fi Direct.

Summary of Embodiment

As described above, according to this embodiment, when the channels used in the Wi-Fi Direct mode and the Wi-Fi Infrastructure mode are set to the same channel, a switching time of the communication system is shortened. Further, even in the case where each device is not selected as a group owner in the Wi-Fi Direct mode, the device can shorten the switching time of the communication system by transmitting a GO-CH change request to the group owner device. Furthermore, even when not only the channel of the AP 50 but also an SSID of the AP 50 are specified or an SSID of the AP 50 is specified instead of the channel in the GO-CH change request and thus a channel used by the AP 50 is changed afterward, the GO-CH is changed according to the change. This allows the switching time of the communication system to be shortened.

Modified Example

The present disclosure is not limited to the embodiment described above and can be variously modified without departing from the gist of the present disclosure.

In the embodiment described above, the Wi-Fi Direct and the Wi-Fi Infrastructure are described as the wireless communication systems as switching targets, but the wireless communication systems switched in the present disclosure are not limited thereto.

Further, this switching of the wireless communication system is not limited to the switching between the communication system through an access point and the communication system not through an access point. In other words, any communication system may be used as long as it has a possibility that radio-frequency ranges overlap between the communication systems as switching targets.

Furthermore, also in the case where there are three or more devices capable of forming a group in the Wi-Fi Direct mode and one of the devices changes the group, to which the device belongs in the Wi-Fi Direct mode, to another group (in the case where a group of a communication target is changed), according to the concept similar to the embodiment described above, the GO-CHs used in the plurality of different groups may be set to be the same channel. In this case, similar processing is executed except for that the AP 50 in the embodiment described above is replaced with another group in the Wi-Fi Direct.

In the embodiment described above, the GO-CH change request from the non-group owner device is transmitted in the Wi-Fi Direct mode by using a channel, which is temporarily set by the group owner device. However, the non-group owner device may first leave the group and switch to another communication system of the Wi-Fi Infrastructure mode or the like, and then transmit the GO-CH change request.

In the embodiment described above, the communication terminal 100 and the TV 200 are described as an example of the information processing apparatus. However, the information processing apparatus according to an embodiment of the present disclosure is not limited thereto and may be any other devices such as a PC (Personal Computer), a DVR (Digital Video Recorder), a game console, a camera, a camcorder, a head mounted display, a speaker, an audio player, and a portable storage device.

Others

The present disclosure can have the following configurations.

(1) An information processing apparatus, including:
a communication unit configured to be capable of switching between a first mode for communicating with a different device by a first wireless communication system and a second mode for communicating with the different device by a second wireless communication system; and
a controller configured to control the communication unit to select a radio-frequency range used in the first mode as a radio-frequency range used in the second mode, in a case where a communication system for communicating with the different device is switched from the first wireless communication system to the second wireless communication system.

(2) The information processing apparatus according to (1), in which
the first wireless communication system is a system for communicating with the different device through an access point,
the second wireless communication system is a system for directly communicating with the different device not through the access point, and
the controller is configured to control the communication unit to use the radio-frequency range specified by the access point in the first mode for communication with the different device in the second mode.

(3) The information processing apparatus according to (2), in which
the controller is configured to control the communication unit to transmit a request signal for requesting the different device to use the radio-frequency range specified by the access point in the first mode for communication with the information processing apparatus, in a case where the different device is determined as a group owner in the second mode, the group owner functioning as an access point in a group including the different device and the information processing apparatus.

(4) The information processing apparatus according to (3), in which
the controller is configured to control the communication unit to include, in the request signal, identification information of the access point and request information for requesting retrieval of the access point on a network based on the identification information and selection of the radio-frequency range specified by the retrieved access point.

(5) The information processing apparatus according to (3), in which
the controller is configured to control the communication unit to include, in the request signal, request information for requesting a change of the radio-frequency range into the radio-frequency range specified by the access point, in a case where a radio-frequency range selected by the different device is different from the radio-frequency range specified by the access point.

(6) The information processing apparatus according to (1), in which
the controller is configured to select, in a case where the information processing apparatus is determined as a group owner functioning as an access point in a group including the information processing apparatus and the different device and receives from the different device a request signal for requesting the information processing apparatus to use a radio-frequency range specified by the access point for communication with the different device in the second mode, the radio-frequency range specified by the access point in accordance with the request signal.

(7) The information processing apparatus according to (6), in which
the request signal contains identification information of the access point, and
the controller is configured to control the communication unit to retrieve the access point on a network based on the identification information and select the radio-frequency range specified by the retrieved access point.

(8) The information processing apparatus according to (2), in which
the different device includes a first device and a second device,
the controller is configured to control the communication unit to use, in a case where communication within a first group including the information processing apparatus and the first device is switched to communication within a second group including the information processing apparatus and the second device in the second mode, a frequency range used in the communication within the first group for the communication within the second group.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
one or more central processing units (CPUs) configured to:
switch between a first mode for communicating with a different device by a first wireless communication system and a second mode for communicating with the different device by a second wireless communication system; and
select a radio-frequency range used in the first mode as a radio-frequency range used in the second mode, in a case where a communication system for communicating with the different device is switched from the first wireless communication system to the second wireless communication system,
wherein the different device is a group owner in the second mode, functioning as an access point in a group including the different device and the information processing apparatus.

2. The information processing apparatus according to claim 1, wherein
the first wireless communication system is a system for communicating with the different device through another access point,
the second wireless communication system is a system for directly communicating with the different device not through the other access point, and
the one or more CPUs are configured to use the radio-frequency range specified by the other access point in the first mode for communication with the different device in the second mode.

3. The information processing apparatus according to claim 2, wherein
the one or more CPUs are configured to transmit a request signal for requesting the different device to use the radio-frequency range specified by the other access point in the first mode for communication with the information processing apparatus.

4. The information processing apparatus according to claim 3, wherein
the one or more CPUs are configured to include, in the request signal, identification information of the other access point and request information for requesting retrieval of the other access point on a network based on the identification information and selection of the radio-frequency range specified by the retrieved access point.

5. The information processing apparatus according to claim 3, wherein
the one or more CPUs are configured to include, in the request signal, request information for requesting a change of the radio-frequency range into the radio-frequency range specified by the other access point, in a case where a radio-frequency range selected by the different device is different from the radio-frequency range specified by the other access point.

6. The information processing apparatus according to claim 3, wherein the request signal comprises a Hypertext Transfer Protocol (HTTP) request.

7. The information processing apparatus according to claim 2, wherein
the different device includes a first device and a second device,
the one or more CPUs are configured to use, in a case where communication within a first group including the information processing apparatus and the first device is switched to communication within a second group including the information processing apparatus and the second device in the second mode, a frequency range used in the communication within the first group for the communication within the second group.

8. The information processing apparatus according to claim 1, wherein
the one or more CPUs are configured to select, in a case where the information processing apparatus is determined as another group owner functioning as another access point in another group including the information processing apparatus and the different device and receives from the different device a request signal for requesting the information processing apparatus to use a radio-frequency range specified by the access point for communication with the different device in the second mode, the radio-frequency range specified by the other access point in accordance with the request signal.

9. The information processing apparatus according to claim 8, wherein
the request signal contains identification information of the other access point, and
the one or more CPUs are configured to retrieve the other access point on a network based on the identification information and select the radio-frequency range specified by the retrieved access point.

10. An information processing method, comprising:
in an information processing apparatus:
detecting a switching event from a first mode for communicating with a different device by a first wireless communication system to a second mode for communicating with the different device by a second wireless communication system; and
selecting a radio-frequency range used in the first mode as a radio-frequency range used in the second mode, in an event switching is performed, wherein the different device is a group owner in the second mode, functioning as an access point in a group including the different device and the information processing apparatus.

11. A non-transitory computer-readable medium having stored therein, a set of computer-executable instructions for causing an information processing apparatus to perform steps comprising:
- detecting a switching event from a first mode for communicating with a different device by a first wireless communication system to a second mode for communicating with the different device by a second wireless communication system; and
- selecting a radio-frequency range used in the first mode as a radio-frequency range used in the second mode, in an event switching is performed,
- wherein the different device is a group owner in the second mode, functioning as an access point in a group including the different device and the information processing apparatus.

* * * * *